United States Patent [19]

Holliday

[11] 4,422,274
[45] Dec. 27, 1983

[54] INSULATED PANEL

[75] Inventor: William H. Holliday, Richmond, Va.

[73] Assignee: Reynolds Metals Company, Richmond, Va.

[21] Appl. No.: 443,016

[22] Filed: Nov. 19, 1982

Related U.S. Application Data

[63] Continuation of Ser. No. 215,017, Dec. 10, 1980, abandoned.

[51] Int. Cl.³ .............................................. E04B 5/00
[52] U.S. Cl. ...................................... 52/410; 52/545; 52/547; 52/714
[58] Field of Search ................ 52/410, 512, 545, 478, 52/547, 404, 269, 573, 714

[56] References Cited

U.S. PATENT DOCUMENTS

| | | |
|---|---|---|
| 2,820,535 | 1/1958 | Hutchison . |
| 2,989,157 | 6/1961 | Mosteller . |
| 3,209,503 | 10/1965 | Mosteller ............................. 52/404 |
| 3,284,117 | 11/1966 | Meehan . |
| 3,511,011 | 5/1970 | Straus .................................... 52/478 |
| 3,879,910 | 4/1975 | Waite ..................................... 52/145 |
| 3,913,288 | 10/1975 | Prescott ................................ 52/127 |
| 3,961,454 | 6/1976 | Adams .............................. 52/404 X |
| 3,998,019 | 12/1976 | Reinwall ........................... 52/545 X |
| 4,100,711 | 7/1978 | Skuran ................................... 52/489 |
| 4,257,204 | 3/1981 | Rieger ............................... 52/404 X |
| 4,269,012 | 5/1981 | Mattingly et al. ................ 52/410 X |

Primary Examiner—Carl D. Friedman
Attorney, Agent, or Firm—Alan T. McDonald

[57] ABSTRACT

An insulating panel structure for tank-like vessels, such as chemical reactors, precipitators and the like is disclosed. The panel structure includes fastening clips which permit a pre-fabricated panel structure to be fastened onto the vessel. These fastening clips permit thermal expansion and contraction of the panel structure with changes in temperature of the vessel without damage to the fastening system.

8 Claims, 4 Drawing Figures

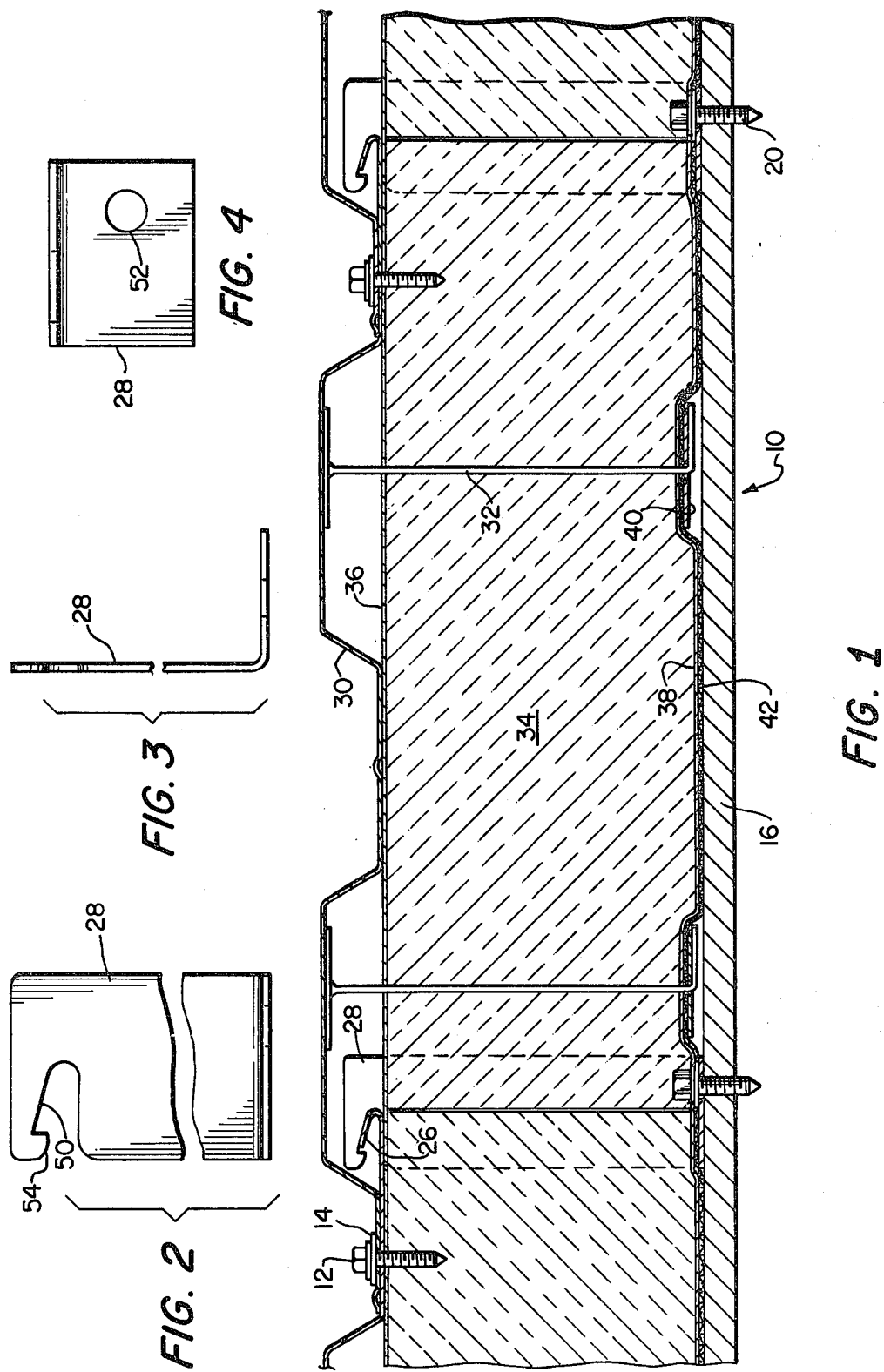

INSULATED PANEL

This application is a continuation of Ser. No. 215,017 filed Dec. 10, 1980, now abandoned.

BACKGROUND OF THE INVENTION

Many heated vessels are employed in industry. Typical of such vessels are chemical reactors, electrostatic precipitators and the like. Such vessels are either themselves heated or contain materials which have been heated or which generate heat. If such a vessel must be heated, fuels such as oil, natural gas, coal and the like must be burned to supply the energy neded to heat this vessel. In the past, when fuels were far less expensive than currently, insulation of such vessels to retain heat supplied to the vessels was not necessary. However, with the ever-increasing fuel costs of today, and with the need to conserve fuel, it has become increasingly important to retain as much heat as possible within such vessels.

Even where such vessels need not be heated, such as in reaction vessels containing exothermic reactions and the like, increased emphasis on safety for plant employees dictates that protective insulation of these hot vessels be employed.

Thus, for whatever the economic or social reason, it has become increasingly popular, and is sometimes necessary, to insulate heated vessels. Numerous insulation panels have been developed to meet this need. Most of these panels have in common an outer surface panel, an insulation material and a means for fixing the panel structure to the walls of the vessel.

Most panel structures for heated vessels are fastened to the vessel by means of screws passing through the panel, the intermediate insulation material and into a girt fastened to the vessel. As insulation needs have increased, requiring thicker insulation batts, the fastening screws required have become longer and longer. Insulation thickness levels have now reached a point where fastening screws, such as stand-off screws, having the properties necessary for such an environment, notably being both self-tapping and penetration depth controlling, are unavailable or available only as a custom-made item, at great expense.

Even when proper fastening screws of the size necessary to fasten these panels to vessels can be obtained, problems do occur with their use. As temperature changes occur within the vessel, and thus throughout the panel structure, expansion and contraction of the panels, due to their thermal elasticity, occurs. When panels are fastened to the vessel and one another by means of screws passing through the panel structure and into the girt, shearing stresses are applied to the fasteners during such expansion and contraction, which shearing forces may eventually cause shearing and failure of the fastener.

THE PRESENT INVENTION

By means of the present invention, fastening clip elements for a panel structure are disclosed which are easy to fabricate at varying lengths, including lengths in excess of those for which suitable screw fasteners for such panel structures are readily obtainable.

When employing such fastening clips in a panel structure, the panels are free to expand and contract while being retained within the fastening clips. This reduces the shearing forces applied to the fastening clips, and prevents their failure in use.

BRIEF DESCRIPTION OF THE DRAWINGS

The panel structure of the present invention will be more fully described with reference to the drawings in which:

FIG. 1 is a cross-sectional view of a panel structure according to the present invention;

FIG. 2 is a front elevational view of the fastening clip employed in the present invention;

FIG. 3 is a side elevational view of the fastening clip; and

FIG. 4 is a top elevational view of the fastening clip.

DETAILED DESCRIPTION OF THE PREFERRED EMBODIMENT

Turning now to FIG. 1, this FIGURE illustrates the panel structure of the present invention and the fastening of the panel structure to a vessel wall. It should be noted that while FIG. 1 illustrates the structure as horizontal, it will be appreciated that, in actual practice, this structure will be vertical, with additional panels being added from left to right, or, in practice, from bottom to top.

The panel structure 10 includes a plurality of overlapping surface panels 30. These surface panels 30 are formed of sheet metal, such as aluminum or steel. Preferably, these panels 30 are formed of aluminum sheet. The surface panels 30 overlap one another both vertically and horizontally, and are fastened to one another through openings within each panel by means of self-tapping stitching fasteners 12 having sealing washers 14, such as rubber washers.

The panels 30 also include a plurality of pins 32 attached thereto. These pins 32 help hold thermal insulation material 34 in place. Thermal insulation material 34, depending upon the temperature to which the panel structure 10 is subjected, may be formed of mineral wool, fiber glass, rock wool, and other insulation-type materials. To provide additional thermal resistance, the insulation batt 34 is preferably covered on its surfaces with metallic foil barrier layers 36 and 38, such as aluminum foil barrier layers, although one or both of these layers may not be required. The insulation batt 34 is placed over the pins 32, prior to assembly of the panel structure 10, wire mesh 42, such as chicken wire, is placed over the insulation batt 34, means for holding the batt 34 and the wire mesh 42 onto the pins 32, such as metallic washers 40, are placed onto the pins 32, and the pins 32 are bent to hold the insulation batt 34 in place, along with the wire mesh 42. It should be noted that the pins 32 are individual pins and are not tracks between which the insulation batt 34 may slide into place.

The surface panels 30, having the insulation material 34 attached thereto, are placed over a girt 16. Girt 16 is the fastening base for the panel structure 10 and is typically mounted vertically. Girt 16 is a metal strip and is attached either adhesively, by welding, or by fastening elements, such as bolts, to the vessel wall (not shown). Preferably, the pins 32 are spaced such that the pins 32 do not fall at the girt 16, however, this is not a requirement for the panel structure 10.

The panel structure 10 is fastened to girt 16 by means of fastening clips 28. These clips 28 include an opening 52 through which a self-tapping fastener 20 may pass and be fastened to girt 16. The fastener 20 may also be self-drilling, to avoid the necessity of drilling pilot holes in girt 16.

The clips 28 are snapped over a reverse-folded end portion 26 of the surface panels 30 and are then fastened to the girt 16 as previously mentioned.

As can best be seen in FIG. 2, the fastening clips 28 include a grooved panel receiving portion 50 and a nose portion 54. These elements 50 and 54 provide for firm retention of the panel structure 10 while permitting expansion and contraction of the surface panels structure 30 with temperature changes without excessive stresses being placed on the fastening clips 28.

As is readily evident, the panel structure 10 is placed onto the girt 16 horizontally, with subsequent panels being placed on top of and overlapping panels in place. Thus, clips 28 are pushed into insulation batt 34, fastened by means of fasteners 20, the surface panel fasteners 12 are fastened in place and a subsequent panel structure 10 placed thereover.

Further, again as is readily evident, the panel structure 10 may have lengths ranging in excess of 30' (9.14 meters) and thus a plurality of fastening clips 28 may be positioned along a panel structure 10 at each girt 16.

The clips 28 are readily formed from sheet metals, such as aluminum and steel. The length of the clip 28 is selected to correspond to the thickness of the insulation bat 34 for a given panel structure 10. Since there is no physical change among various clips 28, other than their variation in length, these clips 28 can be easily and inexpensively made in various sizes.

From the foregoing, it is clear that the panel structure of the present invention provides an insulating panel structure which is easily erected and which permits thermal expansion and contraction without damage to the panel fastening structure.

While presently preferred embodiments of the present invention have been illustrated and described, it will be understood that the invention may be otherwise variously embodied and practiced within the scope of the following claims.

I claim:

1. In a panel structure for insulating vessels, said panel structure including a plurality of surface panels, insulation material, means for fastening said surface panels to one another and means for fastening said panel structure to said vessel, the improvement wherein said surface panels have a side portion thereof fastened to a region adjacent to and inwardly spaced from the opposite side portion of an adjacent surface panel and wherein the opposite side portions of said surface panels are fastened to said vessel by said means for fastening said panel structure to said vessel, said means for fastening said panel structure to said vessel comprising fastening clips, said fastening clips each having a grooved panel receiving portion and a nose portion extending into said panel receiving portion, said panel receiving portion and said nose portion cooperating to snappingly receive said opposite side portions of said surface panels therebetween, said opposite side portions and said surface panels being reverse folded, to thereby firmly retain said surface panels while permitting thermal expansion and contraction of said surface panels.

2. The panel structure of claim 1 wherein said panel structure comprises a plurality of surface panels, insulation batts, pins connected to said surface panels for holding said insulation batts, wire mesh and means for holding said insulation batts and said wire mesh onto said pins.

3. The panel structure of claim 2 wherein said insulation batt is covered on at least one surface thereof with a metallic foil.

4. The panel structure of claim 3 wherein said metallic foil is aluminum foil.

5. The panel structure of claim 2 wherein said means for holding are metallic washers.

6. The panel structure of claim 2 wherein said insulation batt is a rock wool batt.

7. The panel structure of claim 1 wherein said surface panels are aluminum panels.

8. The panel structure of claim 1 wherein said means for fastening said surface panels to one another comprises self-tapping screws.

* * * * *